(12) United States Patent
Davidich et al.

(10) Patent No.: US 11,999,392 B2
(45) Date of Patent: *Jun. 4, 2024

(54) CONDITION CONTROLLING OF A WEAR AND TEAR ELEMENT

(71) Applicant: SIEMENS MOBILITY GMBH, Munich (DE)

(72) Inventors: Maria Davidich, Munich (DE); Dennis Klingebiel, Atlanta, GA (US); Udhayaraj Sivalingam, Munich (DE)

(73) Assignee: Siemens Mobility GmbH, Munich (DE)

( * ) Notice: Subject to any disclaimer, the term of this patent is extended or adjusted under 35 U.S.C. 154(b) by 763 days.

This patent is subject to a terminal disclaimer.

(21) Appl. No.: 16/616,720

(22) PCT Filed: Apr. 19, 2018

(86) PCT No.: PCT/EP2018/060017
§ 371 (c)(1),
(2) Date: Nov. 25, 2019

(87) PCT Pub. No.: WO2018/215144
PCT Pub. Date: Nov. 29, 2018

(65) Prior Publication Data
US 2021/0146975 A1 May 20, 2021

(30) Foreign Application Priority Data
May 24, 2017 (DE) .......... 10 2017 208 828

(51) Int. Cl.
G06N 20/00 (2019.01)
B61L 15/00 (2006.01)
(Continued)

(52) U.S. Cl.
CPC .......... *B61L 15/0081* (2013.01); *B61L 27/57* (2022.01); *G06N 20/00* (2019.01); *G07C 5/004* (2013.01)

(58) Field of Classification Search
CPC ..... B61L 15/0081; B61L 27/57; G06N 20/00; G07C 5/004
See application file for complete search history.

(56) References Cited

U.S. PATENT DOCUMENTS 5,808,906 A * 9/1998 Sanchez-Revuelta ....................... G01B 11/25
702/170
6,585,089 B1 * 7/2003 Parker .................. F16D 65/092
188/218 XL (Continued)

FOREIGN PATENT DOCUMENTS

DE 102007051126 A1 4/2009
DE 102014113371 A1 3/2016
(Continued)

OTHER PUBLICATIONS

"Ordinary least squares"; Apr. 28, 2017; Wikipedia (Year: 2017).*
(Continued)

Primary Examiner — Fadey S. Jabr
Assistant Examiner — Naeem Taslim Alam
(74) Attorney, Agent, or Firm — Laurence A. Greenberg; Werner H. Stemer; Ralph E. Locher

(57) ABSTRACT

An accurate and reliable maintenance method for controlling a condition of a wear and tear element of a track-bound vehicle includes determining a second condition of the element, being a chronological subsequent condition to a first condition, by starting from the first condition of the element, by using a machine learning algorithm, representing a chronological behavior of the element. A first action performable on the element is determined by using the
(Continued)

determined second condition of the element and at least one predefined conditional criterion for the element. A resulting third condition of the element is determined by using a conditional change of the element. The conditional change is a consequence of the first performable action. A second performable action performable on the element is determined one more time by using the resulting third condition of the element and at least one predefined conditional criterion for the element.

14 Claims, 4 Drawing Sheets

(51) Int. Cl.
 *B61L 27/57* (2022.01)
 *G07C 5/00* (2006.01)

(56) References Cited

U.S. PATENT DOCUMENTS

| | | | |
|---|---|---|---|
| 7,023,539 B2* | 4/2006 | Kowalski | B61K 9/08 33/287 |
| 8,504,225 B2 | 8/2013 | Bieker et al. | |
| 10,435,050 B2 | 10/2019 | Nock et al. | |
| 2003/0103216 A1* | 6/2003 | Lopez Gomez | G01B 11/24 356/601 |
| 2004/0138791 A1* | 7/2004 | Dewberry | B60T 17/228 701/33.9 |
| 2011/0084503 A1* | 4/2011 | Li | B60G 17/019 290/1 R |
| 2011/0285522 A1* | 11/2011 | Schuessler | E05B 81/70 340/426.22 |
| 2013/0158894 A1* | 6/2013 | Lee | G01M 17/10 702/34 |
| 2014/0229042 A1* | 8/2014 | Elstorpff | B60T 13/665 701/19 |
| 2015/0001013 A1* | 1/2015 | Mennie | B60T 5/00 188/73.1 |
| 2015/0081159 A1* | 3/2015 | Park | F16D 69/00 701/29.4 |
| 2016/0082993 A1* | 3/2016 | Peltz | B61L 27/50 701/32.4 |
| 2016/0163130 A1* | 6/2016 | Zagajac | G07C 5/0808 701/29.1 |
| 2016/0180610 A1* | 6/2016 | Ganguli | G07C 5/006 701/31.9 |
| 2016/0282108 A1* | 9/2016 | Martinod Restrepo | H04N 25/71 |
| 2016/0285203 A1* | 9/2016 | Yang | H01M 50/249 |
| 2017/0363161 A1* | 12/2017 | Robson | F16D 65/092 |
| 2017/0363518 A1* | 12/2017 | Ehmke | G01M 17/10 |
| 2018/0211520 A1* | 7/2018 | Offenhaeuser | G08G 1/0141 |
| 2018/0251142 A1* | 9/2018 | Wait | G01L 5/284 |
| 2021/0215491 A1* | 7/2021 | Liu | G06Q 50/40 |

FOREIGN PATENT DOCUMENTS

| | | |
|---|---|---|
| WO | 2004024531 A1 | 3/2004 |
| WO | 2012047529 A1 | 4/2012 |

OTHER PUBLICATIONS

Bhoopathi Rapolu; "Wie die künstliche Intelligenz (KI) die Bahnindustrie erober—Bringing artificial intelligence (AI) to the rail industry"; Signalling+Datacommunication; pp. May 2016.

* cited by examiner

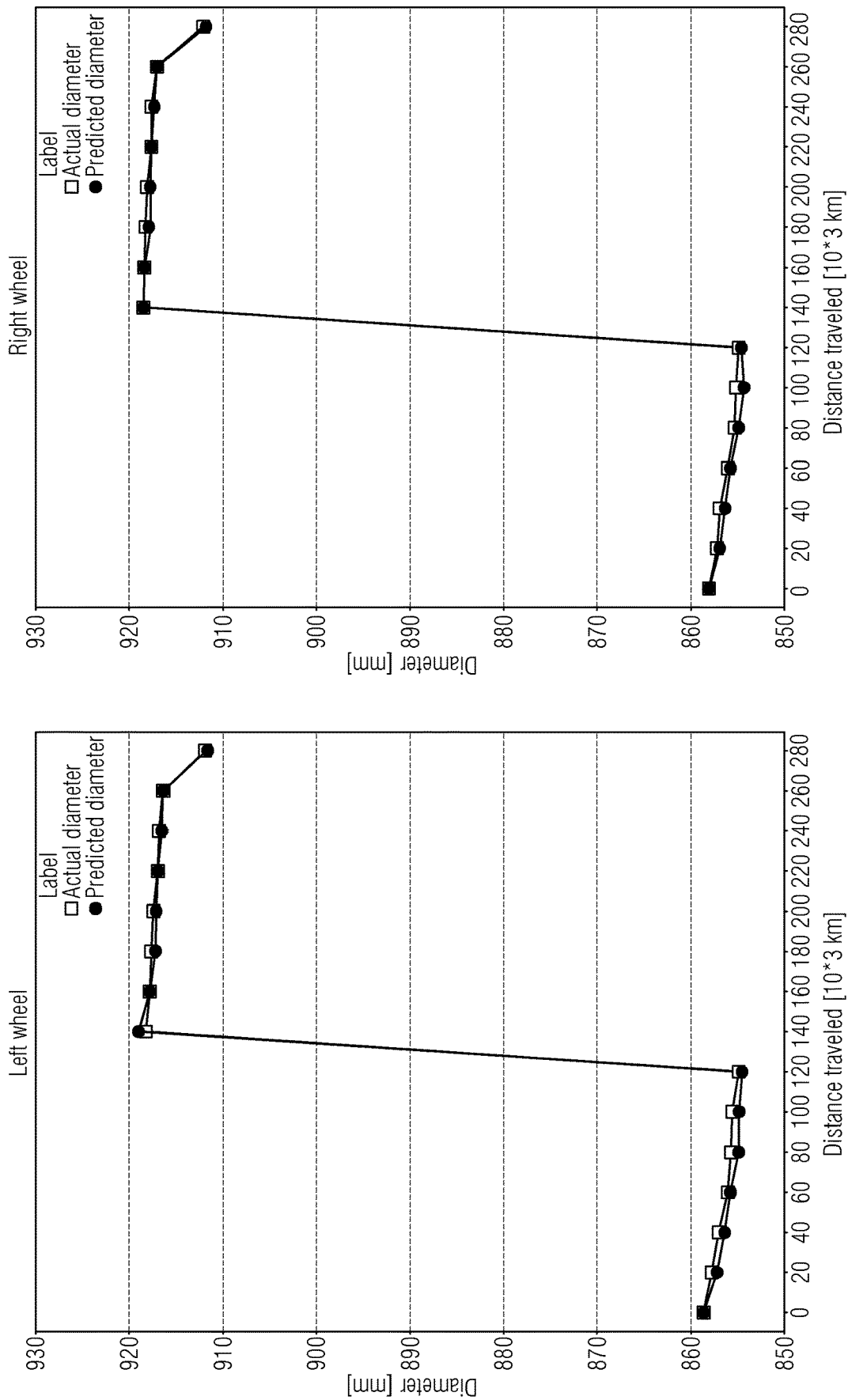

CONDITION CONTROLLING OF A WEAR AND TEAR ELEMENT

FIELD OF THE INVENTION

The present invention relates to a method for controlling a condition of a wear and tear element of a track-bound vehicle. The present invention further relates to a controlling system for controlling a condition of a wear and tear element of a track-bound vehicle.

BACKGROUND TO THE INVENTION

Modern trains operating in modern railway systems are subjected to challenging demands like traveling with high speed, over long durations and distances as well as need to have a long service life. Hence, the train and its components need to withstand all kinds of operating conditions like frequent changes of speed e.g. due to stopping or passing a railway station, train stops at stop signs, speed limits e.g. at bridges or tunnels, weather and thus temperature changes. Thus, supervising the train and especially stressed components of the train is essential to ensure a secure operation of the railway system.

Due to stress, like physical friction with a track, impairing operating components as, for example, a wear and tear element, like a wheel or components of a brake assembly (e.g. brake pad or brake shoe), of a track-bound vehicle damage or wear-out, like deformation, abrasion or cracks, may occur. Hence, parameters, like a wheel profile, a wheel diameter, a wheel flange width a wheel flange height or pad thickness, may change over time. These changes affect the dynamical characteristic of the track-bound vehicle and may even influence the safety of the track-bound vehicle. Therefore, component parameters are measured regularly. If the controlled parameter reaches some critical value, the wear and tear element needs to be re-profiled. Moreover, due to severe workload and/or due to the possible re-profiling process, a parameter of the wear and tear element may be affected to such an extent that the wear and tear element needs to be exchanged.

Regular inspections are necessary to monitor a possible damage or wear-out of the wear and tear elements profile. These inspections include both visual inspections as well as measurements of parameters, like a wheel diameter or profile. Each inspection involves a lot of effort in terms of operational downtime of the vehicle and costs to perform the maintenance. However, they are necessary to find the optimal point of time for re-profiling or exchanging the wear and tear element.

It is a first objective of the present invention to provide a method for controlling a condition of a wear and tear element of a track-bound vehicle with which the above-mentioned shortcomings can be mitigated, and especially, to provide a method that optimizes a maintenance process, that is more flexible, time and cost saving and independent from man power as it is known from prior art systems.

Further, it is a second object of the invention to provide a controlling system with a determining of a condition can be advantageously facilitated.

SUMMARY OF THE INVENTION

Accordingly, the present invention provides a method for controlling a condition of a wear and tear element of a track-bound vehicle.

It is proposed that the method comprises at least the following steps:
  determining a second condition of the wear and tear element, which is a chronological subsequent condition to a first condition, by starting from the first condition of the wear and tear element, by using a machine learning algorithm, which represents a chronological behaviour of the wear and tear element,
  determining a first performable action performable on the wear and tear element by using the determined second condition of the wear and tear element and at least one pre-defined conditional criterion for the wear and tear element,
  determining a resulting third condition of the wear and tear element by using a conditional change of the wear and tear element, wherein the conditional change (is a consequence of) the first performable action, and
  determining one more time a second performable action performable on the wear and tear element by using the resulting third condition of the wear and tear element and at least one pre-defined conditional criterion for the wear and tear element.

Due to the inventive method the profile evolution of the wear and tear element prior to an inspection can be predicted. Advantageously, the prediction works fast. Since the maintenance personnel knows how likely the wear and tear element should be re-profiled or even exchanged maintenance work can be planned more effectively. Furthermore, the spare parts supply can be optimized, because the spare-parts demand is known a priori. This leads to reduced delivery times, reduced capital costs due to more precise information how many components need to be on stock. Moreover, man power during maintenance can be reduced. Additionally, the wear prediction model can be used to save time and money on probably unnecessary inspections, i.e. frequent inspections in the depot are reduced to a minimum. In addition demand on any extra expensive measurements is reduced. Furthermore, the stability of the track-bound vehicle or a pert thereof, like a wagon or bogie, can be positively influenced. This results in high operations safety as well as in high comfort of passengers travel experience. Moreover, the inventive method allows predicting component wear-out for a complex situation. For example, when there is a network of railway tracks and a number of trains (which is much more compared to a situation when one trains runs the same track).

Even if a chosen term is used in the singular or in a specific numeral form in the claims and the specification the scope of the patent (application) should not be restricted to the singular or the specific numeral form. It should also lie in the scope of the invention to have more than one or a plurality of the specific structure(s).

In this context the "first, second and third condition" (or status) is intended to mean a specific state or condition of the wear and tear element at a selected time point. The time point of the second condition is after the time point of the first condition and the time point of the third condition is after the time points of the first and second conditions. The state of the wear and tear element may be the same for all three conditions, or between the first and second condition or between the second and third condition. Most likely the state of the wear and tear element differs between the first and second condition. Thus, there most likely will be a conditional change or a difference of the state of the wear and tear element between the first condition and the second condition.

However, depending on the performable action (details see below) the state of the wear and tear element may differ or be the same between the second and the third condition. Hence, a "conditional change" is intended to mean a difference between the state of the wear and tear element at the second condition and the state of the wear and tear element at the third condition. As stated above, depending on the performable action there may also be a no-difference of the state. Moreover, the phrase "is a consequence of" should be also understood as "a result of" or as "results from". The phrase " . . . criterion for . . . " should be also understood as " . . . criterion in respect to . . . " or as " . . . criterion referring to . . . ."

Furthermore, please note that the third step (and in turn the forth step) is a theoretical consideration independently done from the possibility to perform the first performable action. This step assesses the possible results of the first performable action.

A wear and tear element may be any element that is prone to damage or especially wear-out feasible for a person skilled in the art. The wear and tear element may for example be an element selected out of the group consisting of: a wheel, a brake pad, a brake shoe, screw, a spring, a lock or a centre craft. Most preferably it may be a wheel.

A track-bound vehicle is intended to mean any vehicle feasible for a person skilled in the art, which is, due to a physical interaction with a track, especially a pre-determined track, restricted to this track or path. A physical interaction/connection should be understood as a form fit connection, an electrical connection or a magnetic connection. The physical connection might be releasable. In this context a "pre-determined track" is intended to mean a beforehand existing, human-built track or path comprising selected means building or forming the track, like a rail or a cable. The pre-determined track may be also referred to as track in the following text. Preferably, the pre-determined track is a railway track, like the UK, German or Russian mainline railway.

The vehicle may be a train, an underground railway, a tram or a trolley bus. Preferably, the track-bound vehicle may be a train. Hence, the method can be employed where several vehicles are traveling the same track. Advantageously, the track-bound vehicle or the train may be a high speed train. Thus, the method can be used for a network in which a high level of security is essential and needed. The track-bound vehicle may be also referred to as vehicle or train in the following text. In case the vehicle is a train the wear and tear element is preferably a wheel of the train.

The performable action may be any action or activity performable on the wear and tear element feasible for a person skilled in the art. However, preferably first and/or second and/or third and/or further first performable action is a re-profiling, an exchange of the wear and tear element or a non-action. Hence, the wear and tear element can be suitably handled or machined. A non-action should be also understood as an inaction. The action may be chosen from a list comprising a selection of pre-determined actions. Referring to the cross reverence above. In case the evaluation of the first performable action results in a non-action the state of the wear and tear element is unchanged between the second and third condition.

The machine learning algorithm may be any algorithm feasible for a person skilled in the art and may be selected out of the group consisting of: Supervised learning, semi-supervised learning, unsupervised learning, reinforcement learning and active learning. Preferably the algorithm is a supervised learning algorithm. Supervised learning algorithms try to learn a mapping function between input data and defined target variables. Supervised learning algorithms can be classified into two main categories: Classification algorithms have target variables that are categorical and have class labels (e.g. "wheel profiling is required" or "wheel profiling is not required"). Regression algorithms have target variables that are continuous valued variables (e.g. diameter of the wheel).

In a preferred embodiment of the inventive method the machine learning algorithm is a supervised learning algorism and especially, an automatic regression algorism, and especially, trained by an ordinary least square (OLS) method. Hence, the model is simple and can be trained easily.

Due to the machine learning algorithm the prediction model is adjusted and the condition or state of the wear and tear element is determined by determining a conditional parameter of the wear and tear element. Thus, the method comprises the further step of: Determining at least one conditional parameter of the wear and tear element with the automatic regression algorism by using an ordinary least square (OLS) model.

The pre-defined conditional criterion may be any criterion feasible for a person skilled in the art. Advantageously, the at least one pre-defined conditional criterion is an operational limit of the conditional parameter. Hence, the model operates with well-defined safety criteria. This limit may refer to a maximum or minimum value of a conditional parameter or to a maximum or minimum difference between parameters of the wear and tear element and relating or depending structures, like further wear and tear elements or different structures from the wear and tear element being parts of a higher level assembly comprising the wear and tear element. The pre-defined conditional criterion mentioned in the second and forth step of the method may be the same pre-defined conditional criterion or different pre-defined conditional criteria of the wear and tear element.

Moreover, it is provided that the method comprises the further step of: Checking if the determined conditional change of the wear and tear element complies with at least one plausibility criterion, wherein the conditional change is based on at least one measured or determined conditional parameter referring to the wear and tear element. Hence, at least one measured or determined conditional parameter can be validated in view of its consistency and reliability.

The conditional parameter may be a historic parameter from a prior validation or measurement of the wear and tear element. Since the measurements on the wear and tear element, like a wheel, in depot may contain many inconsistencies it is necessary to ensure that the data is consistent and cleaned of errors and mismeasurements before processing the data.

Such a checking step may also be employed to check the model itself. Hence, the conditional change would refer to the change of state of the wear and tear element between the first and second condition or between the second and third condition. In this case the basis would be the (two) calculated models.

The criteria depend on the historic data or last state or performed action on the surveyed wear and tear element or its specific parameter. For example, if the wear and tear element is a wheel and the historic data results from a measurement of a non-re-profiled and non-exchanged wheel the following criteria may comply:

The diameter of the wheel cannot increase.

A crest/flange height cannot decrease.

A simultaneous decrease of the diameter and a profile of a rolled layer can be detected.

Constant decrease of the diameter.

Constant increase of the rolled layer.

For example, if the wear and tear element is a wheel and the historic data results from a measurement of a wheel being re-profiled after the last measurement the following criteria may comply:

Rapid decrease of the diameter of the wheel.

Rapid decrease of the rolled layer.

For example, if the wear and tear element is a wheel and the historic data results from a measurement of a wheel being exchanged after the last measurement the following criteria may comply:

Rapid increase of the diameter of the wheel.

Rapid decrease of the rolled layer.

Furthermore, it is advantageous when the method comprises the further step of: Selecting training data for the machine learning algorithm by using the at least one plausibility criterion. Thus, only valid data or measurements are used.

In a further embodiment of the invention, the method comprises the further step of: Performing the method for determining of the first and/or second and/or a third and/or a further first performable action as a YES/NO decision by using a decision model. Hence, a result can be obtained easily. Real measurements can be very noisy. Thus, by using this decision model the result is less noisy or has no noise in comparison with real measurements. The decision model refers to at least one conditional parameter.

In addition, it is advantageous when the method comprises the further step of: Mapping the conditional change in the decision model as a YES/NO decision. Hence, the change can be represented in a simple fashion. Preferably, the decision model is a layer of the learning algorithm or an artificial neural network. An input of the layer is the predicted value(s) from the model and an output is the YES/NO decision on re-profiling/exchange action.

According to a preferred refinement, the method comprises the further step of: Describing the first and/or second and/or third condition by at least one conditional parameter. Hence, the condition is defined clearly.

The conditional parameter may be any parameter feasible for a person skilled in the art that may define or characterize a part/section/area of a wear and tear element. Advantageously, the conditional parameter is a parameter selected out of the group consisting of: A diameter, a flange height, a flange width, a flange shoulder width, a slope of a flange shoulder, a groove, a rolled layer, a running tread width, a running tread surface, a work load of the wear and tear element, a travelled mileage of the wear and tear element, a thickness of a brake pad or shoe, an age of the wear and tear element, a profile of a wear and tear element, a roughness of the wear or tear element. A rolled layer may be also referred to as "rolled iron" or as a hardening surface, a strain surface, a work surface or a fatigue hardening surface.

The model may be based on one conditional parameter alone and thus me a one-dimensional system. For each conditional parameter a separate model would be run. Advantageously, the model is a multi-dimensional system mapping several conditional parameters at once.

According to a further aspect of the invention the method comprises the further steps of: Determining a further second condition of a further wear and tear element, which is a chronological subsequent condition to a further first condition, by starting from the further first condition of the further wear and tear element, by using a machine learning algorithm, and determining one more time a follow-up performable action performable on the further wear and tear element by using the resulting further second condition of the further wear and tear element, the third condition of the wear and tear element and at least one pre-defined conditional criterion for the further wear and tear element. Thus, insecurities due to inconsistencies between the wear and tear elements can be avoided.

A "follow-up performable action" may be also called a "dependent performable action". Here, the wear and tear element may be referred to as first wear and tear element and the further wear and tear element as second wear and tear element.

An action that may be performed on the (first) wear and tear element may affect a further proceeding evaluated for or performed on relating structures or the further (second) wear and tear element. Favorably, the (first) wear and tear element and the further (second) wear and tear element are both parts of a mutual structure or a higher level assembly. Thus, the (first) and further (second) wear element may dependent from each other. Such a mutual structure or a higher level assembly may be, for example, a wheel set, a bogie, a brake assembly or a wagon.

In case the first performable action is a non-action, the method may comprise, according to a further realisation of the invention, the further steps of: Determining a resulting forth condition of the wear and tear element, which is a chronological subsequent condition to the second condition, by starting from the second condition of the wear and tear element, by using a machine learning algorithm, which represents a chronological behaviour of the wear and tear element, and determining one more time a third performable action performable on the wear and tear element by using the resulting forth condition of the wear and tear element and at least one pre-defined conditional criterion for the wear and tear element. Consequently, the need of a re-profiling or exchange at a subsequent time can be evaluated. By knowing the wear-out several inspections ahead planning of work needed to be done during the inspection can be performed more effectively. Further, obtaining of necessary spare parts can also be planned ahead.

Preferably, the determining is only done when the resulting second condition has a pre-defined distance to the predefined conditional criterion. In other words, it is determined how far the determined value is from a value that would exceed the conditional criterion or a critical value.

Thus, critical values may be defined for each wear and tear element or e.g. its profile. Reaching a critical value may imply re-profiling or exchange of the element. In case the parameters of the element are close to reach the critical value(s), it is important to understand whether the parameters of the element would be already beyond these critical values by the next inspection. It might be better to do the re-profiling during the current inspection or to wait for the next inspection. This may save material on the element and the element will be still safe till the next inspection. Only during the next inspection re-profiling would be done (in the second case one can safe costs, since the wheel will be used longer).

The invention further relates to a controlling system for controlling a condition of a wear and tear element of a track-bound vehicle.

It is proposed that the controlling system comprises at least one determining device for: Determining a second condition of the wear and tear element, which is a chronological subsequent condition to a first condition, by starting from the first condition of the wear and tear element, by using a machine learning algorithm, which represents a chronological behaviour of the wear and tear element, Determining a first performable action performable on the wear and tear element by using the determined second condition of the wear and tear element and at least one pre-defined conditional criterion for the wear and tear element, Determining a resulting third condition of the wear and tear element by using a conditional change of the wear and tear element, wherein the conditional change is a consequence of the first performable action, and determining one more time a second performable action performable on the wear and tear element by using the resulting third condition of the wear and tear element and at least one pre-defined conditional criterion for the wear and tear element.

Due to the inventive matter the profile evolution of the wear and tear element prior to an inspection can be predicted. Advantageously, the prediction works fast. Since the maintenance personnel knows how likely the wear and tear element should be re-profiled or even exchanged maintenance work can be planned more effectively. Furthermore, the spare parts supply can be optimized, because the spare-parts demand is known a priori. This leads to reduced delivery times, reduced capital costs due to more precise information how many components need to be on stock. Moreover, man power during maintenance can be reduced. Additionally, the wear prediction model can be used to save time and money on probably unnecessary inspections, i.e. frequent inspections in the depot are reduced to a minimum. In addition demand on any extra expensive measurements is reduced. Furthermore, the stability of the track-bound vehicle or a pert thereof, like a wagon or bogie, can be positively influenced. This results in high operations safety as well as in high comfort of passengers travel experience. Moreover, the inventive method allows predicting component wear-out for a complex situation. For example, when there is a network of railway tracks and a number of trains (which is much more compared to a situation when one trains runs the same track).

The controlling system may comprise a computer and may be located at and/or controlled from a control centre of the railway system. Moreover, the list of possible actions, the conditional parameters (historic parameters) and/or the conditional criterion may be stored in a data base of the controlling system or its computer.

The invention and/or the described embodiments thereof may be realised—at least partially or completely—in software and/or in hardware, latter e.g. by means of a special electrical circuit.

Further, the invention and/or the described embodiments thereof may be realised—at least partially or completely—by means of a computer readable medium having a computer program, which computer program, when executed on a computer, realises the method according to the invention and/or according to the embodiments thereof.

Therefore, the technical problem solve by the invention is the automatic predicting of several conditions or the usage or profile of a wear and tear element of a track-bound vehicle, like a train, in short and middle terms. In summary, the proposed method solves the technical problem of the prediction of necessity of re-profiling or exchanging the wear and tear element in case of normal wear, in short and middle terms.

The previously given description of advantageous embodiments of the invention contains numerous features which are partially combined with one another in the dependent claims. Expediently, these features can also be considered individually and be combined with one another into further suitable combinations. Furthermore, features of the method, formulated as apparatus features, may be considered as features of the assembly and, accordingly, features of the assembly, formulated as process features, may be considered as features of the method.

The above-described characteristics, features and advantages of the invention and the manner in which they are achieved can be understood more clearly in connection with the following description of exemplary embodiments which will be explained with reference to the drawings. The exemplary embodiments are intended to illustrate the invention, but are not supposed to restrict the scope of the invention to combinations of features given therein, neither with regard to functional features. Furthermore, suitable features of each of the exemplary embodiments can also be explicitly considered in isolation, be removed from one of the exemplary embodiments, be introduced into another of the exemplary embodiments and/or be combined with any of the appended claims.

BRIEF DESCRIPTION OF THE DRAWINGS

The present invention will be described with reference to drawings in which:

FIG. 4: shows two diagrams depicting a change of diameter for a right and a left wheel of a wheel set over travelled distance.

DETAILED DESCRIPTION OF THE ILLUSTRATED EMBODIMENTS

Figure 1:
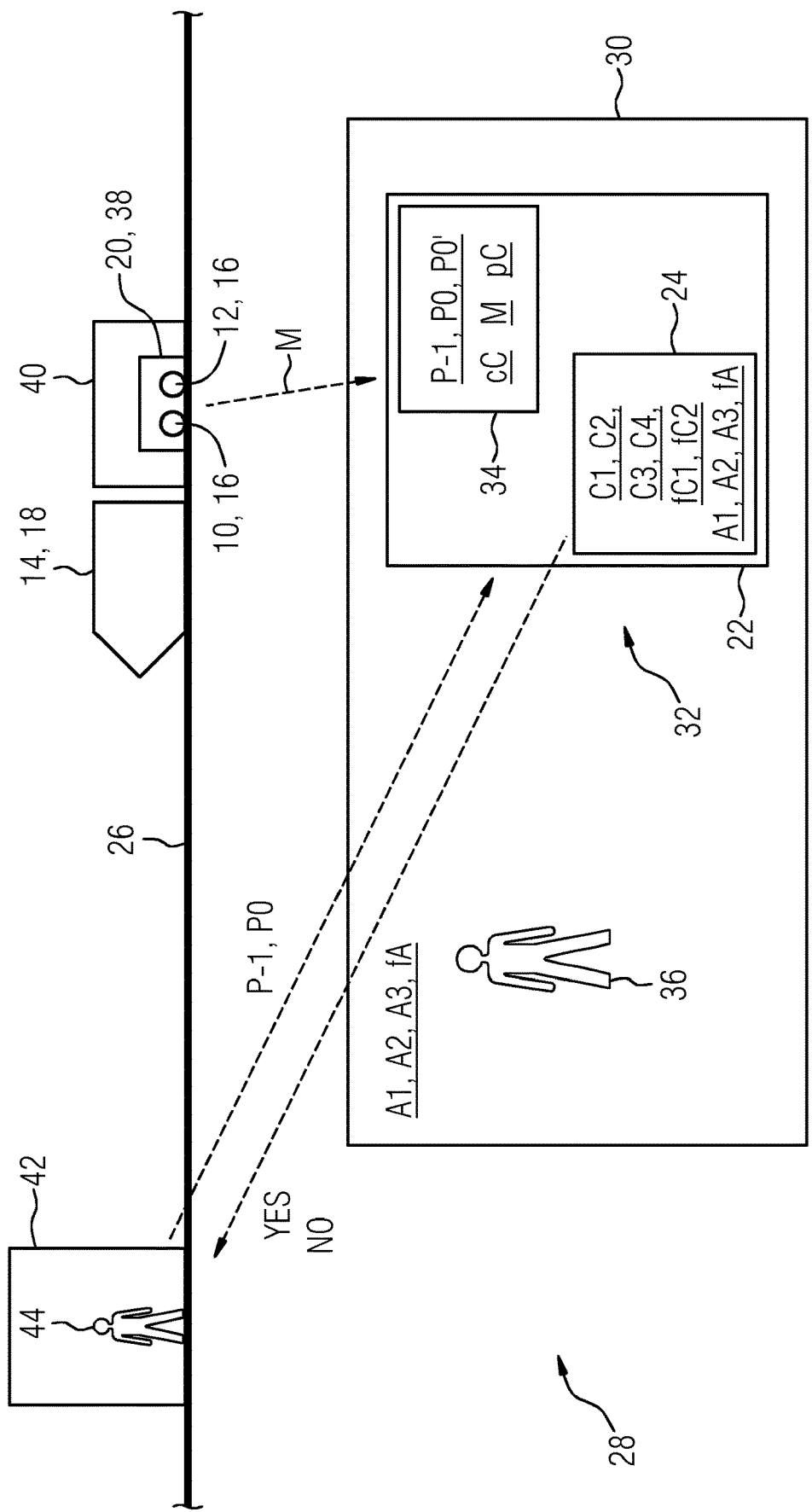
FIG. 1: shows schematically a track with a track-bound vehicle having a wear and tear element as well as a controlling system for controlling a condition of the wear and tear element.

FIG. 1 shows in a schematically view a pre-determined track 26 of a railway system 28, like, for example, the German or Russian mainline railway. Moreover, FIG. 1 shows a track-bound vehicle 14, like a train 18 in the form of a high speed train 18, being moveable on the pre-determined track 26.

The railway system 28 further has a control centre 30 that comprises a computer 32 equipped with an appropriate computer program that comprises instructions which, when executed by the computer 32, cause the computer 32 to carry out the steps of a controlling method. The proposed method provides the prediction of a (first, second, third or follow-up) action or specifically, a necessity of re-profiling (action) or exchanging (action) the wear and tear element 10, 12 in case of normal wear, in short and middle terms. Further, it provides the possibility of a non-action and thus no re-profiling or exchange.

Moreover, the control centre 30 comprises as part of the computer 32 a controlling system 22 for performing a method for controlling a condition C1, C2, C3, C4, fC1, fC2 of a wear and tear element 10, 12 of the track-bound vehicle 14. Therefore, the controlling system 22 comprises at least one determining device 24 to perform determining steps of the controlling method. The determining device 24 is a processing device. Moreover, it comprises a storage device 34 for storage of measured, determined or calculated conditional parameters P−1, P0, P0' (historic values), conditional criteria cC or plausibility criteria pC. The control centre may be supervised by an operator 36.

The wear and tear element 10, 12 may be a wheel 16, a brake pad, a brake shoe, a screw, a spring, a lock or a centre craft. However, the invention will be described exemplarily on a wheel 16. The wear and tear element 10, 12 may be a part of a higher level assembly or a mutual structure 20, like in case of a wheel 16, a wheel set, a bogie 38 or a wagon 40. For example, a wagon 40 may have two bogies 38. A bogie 38, in turn, may have two axles with two wheels 16 for each axle, consequently a bogie 38 having four wheels 16 and a wagon 40 eight wheels 16.

In FIG. 1 two wear and tear elements 10, 12 belonging to the same boogie 38, but not the same set are exemplarily shown. The inventive method will be described by defining the wear and tear element 10 as the mainly examined or first wear and tear element and the other wear and tear element 12 as the further, second or subordinate wear and tear element. However, in praxis both wear and tear elements 10, 12 would be treated individually by the inventive method and the "ranking" of the wear and tear elements 10, 12 would be vice versa.

The inventive method for controlling the condition C1, C2, C3, C4, fC1, fC2 of the wear and tear element 10, 12 of the track-bound vehicle 14 uses in this exemplary embodiment historical data or historic conditional parameter P−1 of wheel measurements to predict the wheel wear-out. Thus, each condition C1, C2, C3, C4, fC1, fC2 is described by at least one conditional parameter P−1, P0, P0', P+1. This parameter P−1, P0, P0', P+1 may be, for example, a diameter D, a flange height fH, a flange width fW, a flange shoulder width fsW, a slope S of a flange shoulder FS, a groove G, a rolled layer rL, a running tread width rtW, a running tread surface rtS, a work load of the wear and tear element 10, 12, a travelled mileage M of the wear and tear element 10, 12, a thickness of a brake pad or shoe, an age of the wear and tear element 10, 12, a profile of a wear and tear element 10, 12, a roughness of the wear or tear element 10, 12. In the following description the method will be explained exemplarily with only one kind of parameter P−1, P0, P0', P+1, like the diameter D of a wheel 16. In general, the method may be performed for each parameter as a one-dimensional model or for several parameters as a multi-dimensional model.

The historic conditional parameter P−1 (and the conditional parameters P0, P0', P+1 for predictions in the future) may be obtained during a maintenance process done in a depot 42 by maintenance personal 44, for example, by performing measurements on the wear and tear element 10, 12 or reading out log books of the train 18. Measurements of wheel shape and its conditional parameters P−1 (P0, P0', P+1) are performed as a standard procedure with a regular frequency in a maintenance depot 42 and thus historical data of wheel measurements can be obtained. Frequency of the measurement is determined by a fixed number of days or mileage M that the train 18 should run between inspections. For example, the following parameters P−1 (P0, P0', P+1) are repeatedly measured or gathered: a crest or flange height fH, a rolled layer rL, a thickness or width of the crest/flange fW, a diameter D of the wheel 16, wheel mileage M.

Also for every type of train 18 the critical values of conditional parameters P0, P0', P+1 are known when the wheel 16 should be re-profiled or exchanged. Apart from that it is usually inspected whether there is any damage on a wheel 16. Also statistics on how the diameter D of a wheel 16 is usually reduced due to re-profiling is known and the information thereto is stored in the storage device 34.

Figure 2:
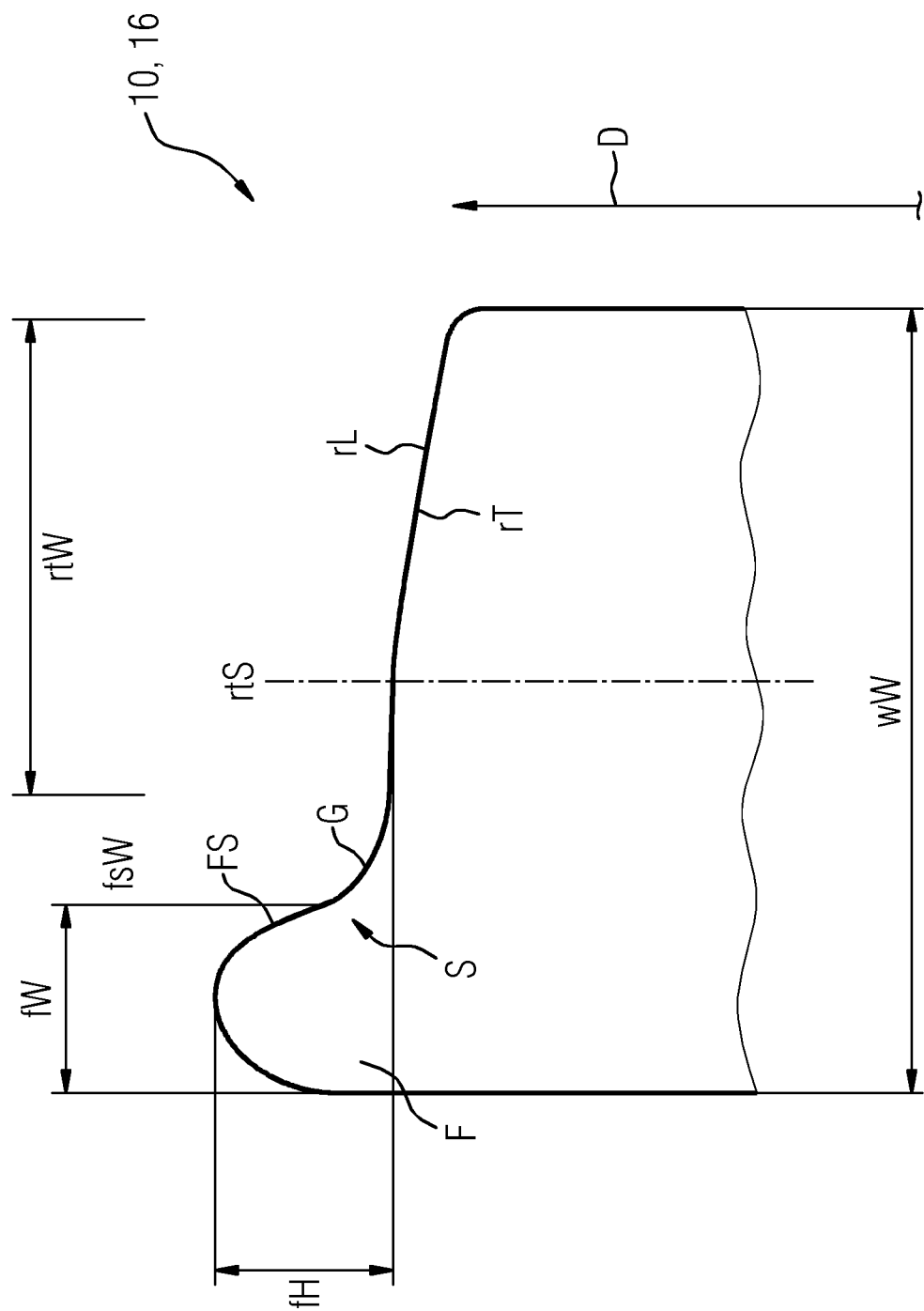
FIG. 2: shows schematically a side view of a wheel of the track-bound vehicle from FIG. 1, FIG. 3: shows a block-diagram of an operational strategy according to the inventive controlling method

In FIG. 2 a side view of a wheel 16 with a crest or flange F and a wheel or running tread rT is shown to depict the different structures of a wheel 16, like the diameter D, the flange height fH, the flange width fW, a flange shoulder width fsW, a slope S of a flange shoulder FS, a groove G, a rolled layer rL, a running tread width rtW, a running tread surface rtS or a width wW, that may be measured.

Figure 3:
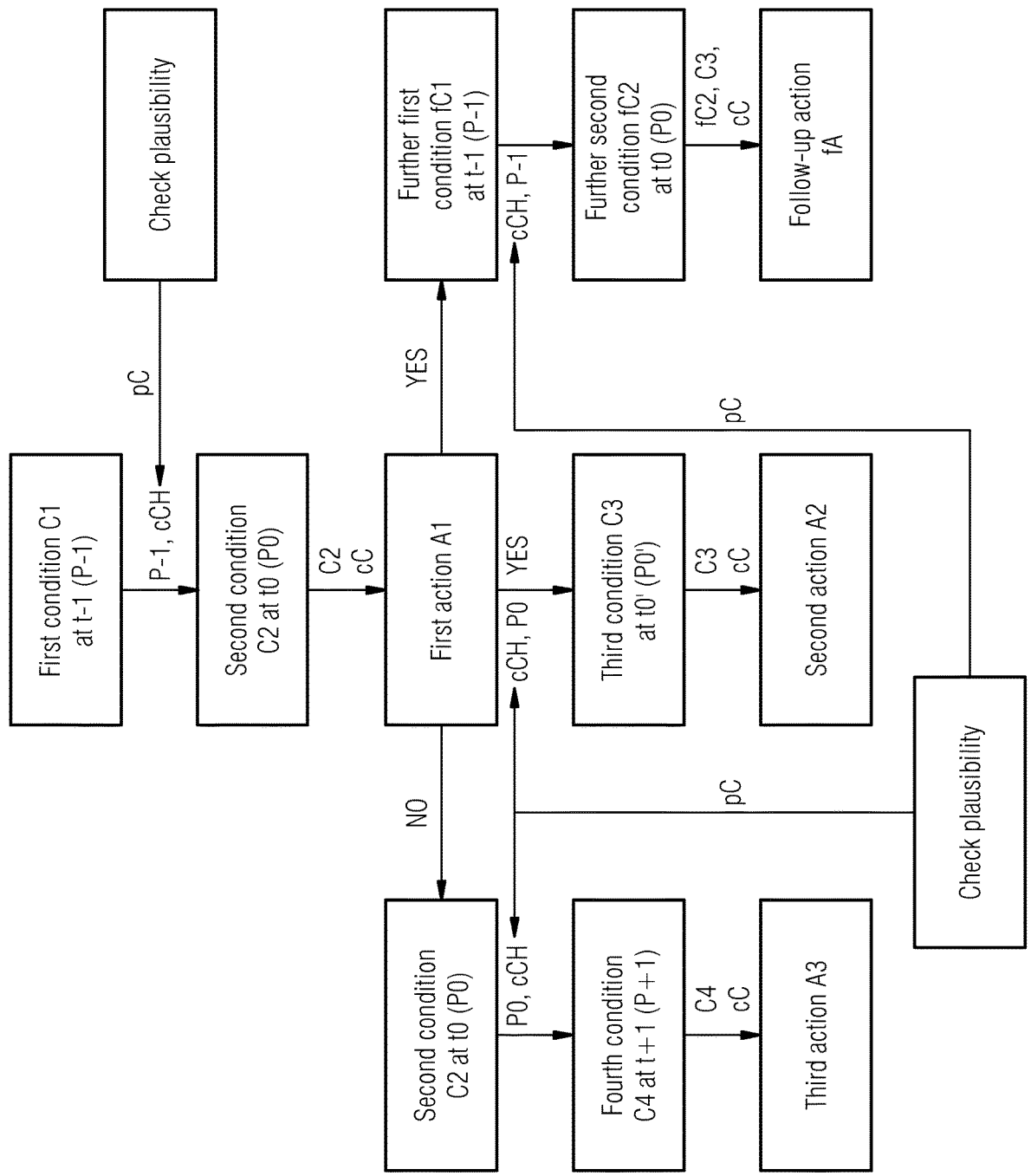

FIG. 3 shows in a block-diagram the strategy of the inventive method. The method comprises the step of: Determining a second condition C2 of the—first or main—wear and tear element 10, which is a chronological subsequent condition to a first condition C1, by starting from the first condition C1 of the wear and tear element 10, by using a machine learning algorithm, which represents a chronological behaviour of the wear and tear element 10.

For example, for a time point t0, like the time point t0 for the next inspection or maintenance, the condition C2 of a wheel 16, like a value of the diameter D of the wheel 16, is predicted. Therefore, historical data are or parameter P−1 (diameter D) known from time point t−1, when wheel 16 had had condition C1, is validated by the machine learning algorithm. As stated above, condition C1 is described by parameter P−1 (diameter D of wheel 16 at time point t−1). The machine learning algorithm is a supervised learning algorism and especially, an automatic regression algorism, and especially, trained by an ordinary least square (OLS) method (details see below).

In a subsequent step a first performable action A1 performable on the wear and tear element 10 is determined by using the determined second condition C2 of the wear and tear element 10 and at least one pre-defined conditional criterion cC for the wear and tear element 10. Hence, the result from the regression model or the concrete diameter value (condition C2 or predicted parameter P0 at time point t0) is evaluated in such if it complies a pre-defined conditional criterion cC or several conditional criteria cC. The pre-defined conditional criterion cC is an operational limit of the conditional parameter P0. Possible pre-defined criteria will be described below.

The result from this evaluation, in turn, is a classification decision. Hence, the method for determining of the first performable action A1 is performed as a YES/NO decision by using a decision model. The YES/NO answer, of course, depends from the asked question. In this exemplary embodiment, the questions may be: "Is a re-profiling necessary?", "Is an exchange necessary?" or "Should nothing be done?" Hence, the first performable action A1 may be a re-profiling of the wear and tear element 10, an exchange of the wear and tear element 10 or a non-action.

The strategy shown in FIG. 3 examines either the question: "Is a re-profiling necessary?" or "Is an exchange necessary?" If the answer is YES the first action A1 would result in a conditional change cCH of the wear and tear element 10 or of parameter P0, namely from condition C2 to a third condition C3 with parameter P0'. In other words, there would be a change in diameter D between time point t0 and time point t0', the time point after re-profiling or after the exchange of the wheel 16. Hence, the method comprises the further step of: Mapping the conditional change cCH in the decision model as a YES/NO decision.

Moreover, to ensure that the wear and tear element 10 still complies safety criteria of the railway system, especially after a done re-profiling, the resulting third condition C3 of the wear and tear element 10 is determined by using the conditional change cCH of the wear and tear element 10, wherein the conditional change cCH is a consequence of the first performable action A1. Moreover, one more time a second performable action A2 performable on the wear and tear element 10 is determined by using the resulting third condition C3 of the wear and tear element 10 and at least one predefined conditional criterion cC for the wear and tear element 10. Here, the pre-defined conditional criterion cC is an operational limit of the conditional parameter P0'. Moreover, also the second action A2 can be a re-profiling, an exchange or a non-action. Further, the pre-defined conditional criterion cC may be the same as the one applied to determine the first performable action A1 of the wear and tear element 10 or another. The pre-defined conditional criterion cC is an operational limit of the conditional parameter P0'.

Furthermore, it is possible to check the plausibility of either used historic data or conditional parameter P−1 or of the predicted parameters P0, P0', P+1. Hence, in an optional step of the method it is checked if the determined conditional change cCH of the wear and tear element 10 complies with at least one plausibility criterion pC, wherein the conditional change cCH is based on at least one measured or determined conditional parameter P−1, P0, P0', P+1 referring to the wear and tear element 10 (details see below). However, to ensure the validity of the used historic data this step should at least be performed on the historic conditional parameter P−1. Since this historic date or the conditional parameter P−1 is used for the machine learning algorithm training data for the machine learning algorithm can be selected by using the at least one plausibility criterion pC.

Moreover, the first performable action A1 may also influence the state or fate of other structures or a further—second—wear and tear element 12. In general, it may be one further wear and tear element 12 or several. All wear and tear elements 10, 12 may be of the same kind, like all wear and tear elements 10, 12 are wheels 16, or belong to different categories, like one is a wheel 16 and another a brake pad. Further, the—first or main—wear and tear element 10 and the further—second—wear and tear element 12 may be both parts of a mutual structure 20 or higher level assembly, like a wheel set, a bogie 38 or a wagon 40. Hence, the further wear and tear element 12 may be viewed as a dependent structure from the—first—wear and tear element 10.

Hence, a further second condition fC2 (diameter D (P0) of the further wear and tear element 12 at time point t0) of the further wear and tear element 12, which is a chronological subsequent condition to a further first condition fC1 (diameter D (P−1) of the further wear and tear element 12 at time point t−1), is determined by starting from the further first condition fC1 of the further wear and tear element 12, by using the machine learning algorithm.

Subsequently, one more time a follow-up performable action fA (like a re-profiling, an exchange or a non-action) performable on the further wear and tear element 12 is determined by using the resulting further second condition fC2 of the further wear and tear element 12, the third condition C3 of the—first—wear and tear element 10 and at least one predefined conditional criterion cC for the further wear and tear element 12. This pre-defined conditional criterion cC may be the same as the one applied to determine the first performable action A1 of the—first—wear and tear element 10 or another. The pre-defined conditional criterion cC is an operational limit of the conditional parameter P0. Possible pre-defined criteria will be described below.

Analogous steps to determining the third condition C3 of the—first—wear and tear element 10 and the second performable action A2 performable on the—first—wear and tear element 10 can be performed for the further wear and tear element 12.

In case the first performable action A1 is a non-action (in this exemplary embodiment the answer to the question "Is a re-profiling/exchange necessary?" would be "NO") it may be also possible to check if the wear and tear element 10 should be undergo a preventive re-profiling or exchange. Hence, a resulting forth condition C4 (parameter P+1 at time point t+1) of the wear and tear element 10, which is a chronological subsequent condition to the second condition C2 (parameter P0 at time point t0) is determined by starting from the second condition C2 of the wear and tear element 10, by using the machine learning algorithm, which represents a chronological behaviour of the wear and tear element 10 and further one more time a third performable action A3 performable on the wear and tear element 10 is determined by using the resulting forth condition C4 of the wear and tear element 10 and at least one pre-defined conditional criterion cC for the wear and tear element 10.

Again, the performable action may be a re-profiling, an exchange or a non-action. This pre-defined conditional criterion cC may be the same as the one applied to determine the first (and second) performable action(s) A1 (A2) of the wear and tear element 10 or another. The pre-defined conditional criterion cC is an operational limit of the conditional parameter P+1. Possible pre-defined criteria will be described below.

Analogous steps to determining the third condition C3 of the wear and tear element and the second action A2 performable on the wear and tear element 10 can be performed after the third performable action A3. Moreover, consequences of the third performable action A3 on the further wear and tear element 12 may be also considered and performed as stated above.

Furthermore, critical values may be defined for each wear and tear element 10 or e.g. its profile. Reaching a critical value of parameter P0 may imply re-profiling or exchange of the wear and tear element 10. In case the parameter P0 of the wear and tear element 10 is close to reach the critical value(s), it is important to understand whether the parameter P0 of the wear and tear element 10 would be already beyond these critical values by the next inspection at time point t+1. It might be better to do the re-profiling during the current inspection (t0) or to wait for the next inspection (t+1).

Thus preferably, the determining steps of the fourth condition C4 and third performable action A3 are only done when the resulting second condition C2 has a pre-defined distance to the pre-defined conditional criterion cC. In other words, it is determined how far the determined value (parameter P0) is from a value that would exceed the conditional criterion cC or a critical value.

In the following passages the method will be exemplarily described in detail for a wheel 16 as the wear and tear element 10 and the parameter P−1, P0, P0', P+1 as a diameter D of the wheel 16.

In a first—pre-processing—step the validity of the historic data is checked. The measurements on the wheels 16 in depot 42 may contain many inconsistencies. Before processing the historic data (parameter P−1 from the last inspection or parameters from earlier inspections, like two, three or four inspection intervals back) it is necessary to make sure that the data is consistent and cleaned of errors and mismeasurements. Therefore, it is necessary to check the following plausibility criteria pC:

The diameter D of a wheel 16 cannot increase. The wheel diameter D only increases if the wheel 16 has been changed after the last inspection.

A height fH of the wheel crest or flange F cannot decrease as soon as no exchange of wheel 16 has been performed after the last inspection. The height fH of the flange F may decrease only due to re-profiling. If it is the case, it should happen simultaneously with re-profiling. Re-profiling can be identified by a rapid decrease of a wheel diameter D within a very short period of time.

The decrease of the wheel diameter D should be simultaneously with decrease in a profile of a rolled layer rL.

The wheel diameter D should constantly decrease unless the wheel 16 has been changed.

The rolled layer rL should constantly increase when the train 18 is running (the diameter D is decreasing), but rapidly decrease when the wheel 16 has been re-profiled or changed.

All these plausibility criteria pC would also apply to a plausibility check for the determined parameters P0, P0', P+1.

In a further step the prediction model is built. To define the supervised learning setting more formally, let x(i) denotes the input variables, also called "features", and y(i) denotes the "target" or "output" variable. A pair (x(i), y(i)) is called a "training sample", and a list of N training samples {(x(i), y(i))} where i=1, 2, 3 . . . , N is called a "training set". The goal is to learn a function h: X→Y, where X, Y represents space of input values and space of output values respectively. This function h is generally called a "hypothesis".

The wheel profile prediction model comes under supervised regression problem. It is supervised because we learn a mapping function between input variables/signals to the target variables with a help of our prediction model.

It is regression because the target variables (i.e. diameter D of the wheel 16) are continuous valued variables. The data points in our training data is measured across time, the value target variable (i.e. diameter D) y(t0) measured at time t0 depends on the work done by the wheel 16 and the previous value of the target variable y(t−1) measure at time t−1 (value of parameter P−1). These kinds of problems come under the categories of time series analysis.

The inventive method uses a modified version of an Auto regression model, since it is simple and can be trained easily using standard ordinary least squares (OLS) method.

The model is formulated as follows, $$y(t0)=\alpha+\beta y(t-1)+\gamma z$$

Where y(t0) denotes the value of the target variable (for example, the diameter D of the wheel 16) at time step t0, y(t−1) denotes the value of the target variable at time step (t−1), z denotes the work done (calculated in terms of mileage M) by the wheel 16 until the time step t0, α is the regression constant, β and γ are regression coefficients.

The basic assumption here is that the value of the target variable (parameter P0) depends on the previous values of the target variable (parameter P−1). The mileage variable is added to the model in order to utilize the trend (decreasing diameter D) found in the measurement data.

In general, building a prediction model consists of training, validation and testing of the model. The entire data set is separated in to training, validation and testing data set.

The model is trained with the training data in which the internal parameters P−1, P0, P0', P−1 of the model are optimized. Once the model is optimized, the performance of the models is evaluated with the testing data.

In this case the input data set is prepared in such a way that to fit the formulated model as described above. Then regression constant α and the regression coefficients β, γ are learnt through OLS regression method.

Also binned auto regression technique is introduced in the training procedure. Binned auto regression is defined as, binning the diameters into "n" bins and train a separate model for each bin. In that way the models are able to capture the variation in the behaviour of wheel wearing at different diameters D of the wheels 16. These learned model parameters P0, P+1 are used to predict the value of the target variables in future for 1, 2, . . . n number of time steps.

Now the transformation of the model prediction to a decision will be discussed. The predicted target variables from the model are passed through a layer which consists of rules based on the safety regulations or the conditional criterion cC (see below). The input of the layer is the predicted values or parameters P0, P0', P+1 from the model and the output is A YES/NO decision e.g. on re-profiling/wheel change actions A1, A2, A3, fA.

Safety regulations specify under which conditions the wear and tear element 10, 12 or the wheels 16 should be re-profiled or exchanged. The criteria to do re-profiling of or to change the wear and tear element 10, 12 or, in this exemplary embodiment the wheel 16, may consider the following parameters P−1, P0, P0', P−1 of the wheel 16 (safety regulations):

The wheel flange height fH should lay within certain limit. A minimal and maximum height fH of the flange F is given. The flange height fH should be smaller than 5% of the diameter D of the wheel 16 and bigger than 3% of the diameter D of the wheel 16. For example, "Velaro Russia" trains have a minimal flange width fW of 28 Millimetre (mm) and a maximum flange width fW of 35 mm.

The wheel flange width fW should lie within certain limit. A minimal and maximum width fW of the flange F is given. The flange width fW should be smaller than 4% of the diameter D of the wheel 16 (smaller than 25% of a width wW of the wheel 16) and bigger than 3% of the diameter D of the wheel 16 (bigger than 20% of a width wW of the wheel 16). For example, "Velaro Russia" trains have a minimal flange width fW of 28 mm and a maximum flange width fW of 34 mm.

Maximal/critical wear-out on a wheel 16 is limited, e.g. the maximal decrease of a diameter of a wheel 16 is 5 mm before a re-profiling step.

A rim thunder should be smaller than a fixed threshold. For example, the rim thunder should be smaller than 3 mm for "Velaro Russia" trains.

The critical diameter D is the minimal diameter D that defines when the wheel 16 should be exchanged. For example, for "Velaro Russia" trains, the minimal diameter D of a wheel 16 is 853 mm (the original diameter D being 920 mm) and thus, by a discrepancy of diameters D of about of 7.5%.

The difference between the diameters D of the wheels 16 within one wheel set should be below some threshold value, like 0.15%. For example, for "Velaro Russia" trains it is 1.2 mm.

The difference between the diameters D of the wheels 16 within one bogie 38 should be below some threshold and usually, the threshold is different between powered and non-powered wagons 40. It should be smaller than 0.6% for powered wagons 40, and smaller than 1.75% for unpowered wagons 40. For example, for "Velaro Russia" the difference should be smaller than 5 mm for powered wagons 40, and smaller than 15 mm for non-powered wagons 40.

The difference between the diameters D of the wheels 16 within one wagon 40 should be also below some threshold. Usually, the threshold is different between powered and non-powered wagons 40. It should be smaller than 0.6% for powered wagons 40, and smaller than 3.5% for unpowered wagons 40. For example, for "Velaro Russia" trains the difference should be smaller than 5 mm for powered wagons 40 and smaller than 30 mm for non-powered wagons 40.

These critical values or conditional criteria cC are included in the proposed prediction model to decide when a re-profiling or exchange of the wheel 16 will be necessary.

The prediction model can be summarised as follows:

To predict whether the performable action A1, for example a re-profiling, is needed during the next inspection (t0) the values for target variables are calculated one step ahead and if any of the target variables has reached their threshold or don't comply the conditional criteria cC the re-profiling should be done. Hence, for this wheel 16 for which the threshold is reached the model recommends to do a re-profiling.

Having the statistics from previous re-profiling procedures, i.e. knowing mean difference before and after re-profiling, the new diameter D for a wheel 16 can be calculated and be used to predict the result of the re-profiling. Having this new diameter D in mind again the conditional criteria cC is checked and it is determined if a new predicted diameter D exceeds any of the thresholds of the conditional criteria cC.

Moreover, the optional and/or subsequent steps can be summarised as follows:

The performable action A1 or the re-profiling of one wear and tear element 10 or wheel 16 may cause re-profiling of some other depended further wear and tear element 12 or wheel 16 as well.

Also sometimes it is needed to predict whether the so-called preventive re-profiling should be done. Preventive re-profiling is usually done when the wheels havent reached the critical parameter values yet but are near to those values and it should be avoided that the parameters of the wheels 16 reach the critical values before the next inspection. In this case the model should predict the target values not for one step but for two steps ahead (the values for over next inspection.

In FIG. 4 the results from a test run are shown as two diagrams depicting a change of diameter D for a left (left diagram) and a right wheel 16 (right diagram) of a wheel set of a non-powered wagon 40 over travelled distance. On the y-axis the diameter (in mm) is plotted and on the x-axis the travelled distance (in 10*3 km). The graphs with the solid dots show the predicted values of the diameter D and the graph with the open squares the measured values of the diameter D. As can be seen in the diagrams, the actual and predicted values of the wheel diameters D align perfectly. Thus, the model works very well. The rapid raise of the graph indicates an exchange of the wheel 16.

Thus, having predicted the correct value for the diameters, it could be predicted correctly for every wheel 16 if the re-profiling is necessary and taking into account the statistics how the diameter D is reduced due to re-profiling have predicted whether the consequent re-profiling of other wheels would be necessary as well.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

Although the invention is illustrated and described in detail by the preferred embodiments, the invention is not limited by the examples disclosed, and other variations can be derived therefrom by a person skilled in the art without departing from the scope of the invention.

The invention claimed is:

1. A method for controlling a condition of a wear and tear element of a track-bound vehicle, the method comprising:
   determining a second condition of the wear and tear element, being a chronologically subsequent condition to a first condition, by starting from the first condition of the wear and tear element and using a machine learning algorithm representing a chronological behavior of the wear and tear element;
   providing a supervised learning algorithm as the machine learning algorithm, wherein the supervised learning algorithm is trained by an ordinary least square method;
   determining a first performable action performable on the wear and tear element by using the determined second condition of the wear and tear element and at least one predefined conditional criterion for the wear and tear element;
   determining a resulting third condition of the wear and tear element by using a conditional change of the wear and tear element, the conditional change being a consequence of the first performable action;
   determining a second performable action performable on the wear and tear element by using the resulting third condition of the wear and tear element and the at least one predefined conditional criterion for the wear and tear element;
   carrying out at least one action selected from the group consisting of the first performable action and the second performable action as machining of the wear and tear element; and
   adjusting a wear prediction model with the machine learning algorithm, and using the wear prediction model to reduce a number of inspections of the wear and tear element.

2. The method according to claim 1, which further comprises checking if the determined conditional change of the wear and tear element complies with at least one plausibility criterion, and basing the conditional change on at least one measured or determined conditional parameter referring to the wear and tear element.

3. The method according to claim 2, which further comprises selecting training data for the machine learning algorithm by using the at least one plausibility criterion.

4. The method according to claim 1, which further comprises carrying out a third or a follow-up performable action as a re-profiling or an exchange of the wear and tear element.

5. The method according to claim 1, which further comprises determining at least one of the first or the second or a third or a follow-up performable action as a YES/NO decision by using a decision model.

6. The method according to claim 5, which further comprises mapping the conditional change in the decision model as a YES/NO decision.

7. The method according to claim 1, which further comprises at least one of:
   describing at least one of the first or the second or the third condition by using at least one conditional parameter, or
   selecting the conditional parameter from the group consisting of: a diameter, a flange height, a flange width, a flange shoulder width, a slope of a flange shoulder, a groove, a rolled layer, a running tread width, a running tread surface, a work load of the wear and tear element, a travelled mileage of the wear and tear element, a thickness of a brake pad or shoe, an age of the wear and tear element, a profile of the wear and tear element and a roughness of the wear or tear element.

8. The method according to claim 1, which further comprises selecting the wear and tear element from the group consisting of a wheel, a brake pad, a brake shoe, a screw, a spring, and a lock.

9. The method according to claim 1, which further comprises selecting the wear and tear element as a wheel of the track-bound vehicle, wherein the track-bound vehicle is a train.

10. The method according to claim 2, which further comprises selecting the at least one predefined conditional criterion as an operational limit of the at least one measured or determined conditional parameter.

11. The method according to claim 1, which further comprises:
    determining a further second condition of a further wear and tear element, being a chronologically subsequent condition to a further first condition, by starting from the further first condition of the further wear and tear element and using the machine learning algorithm; and
    determining a follow-up performable action performable on the further wear and tear element by using the further second condition of the further wear and tear element, the third condition of the wear and tear element and at least one predefined conditional criterion for the further wear and tear element.

12. The method according to claim 11, wherein the wear and tear element and the further wear and tear element are both parts of a mutual structure.

13. The method according to claim 1, further comprising, when the first performable action is a non-action:
    determining a resulting fourth condition of the wear and tear element, being a chronologically subsequent condition to the second condition, by starting from the second condition of the wear and tear element and using the machine learning algorithm representing the chronological behavior of the wear and tear element; and
    determining a third performable action performable on the wear and tear element by using the resulting fourth condition of the wear and tear element and the at least one predefined conditional criterion for the wear and tear element.

14. A control system for controlling a condition of a wear and tear element of a track-bound vehicle, the control system comprising at least one determining device for:
    determining a second condition of the wear and tear element, being a chronologically subsequent condition to a first condition, by starting from the first condition of the wear and tear element and using a machine learning algorithm representing a chronological behavior of the wear and tear element;
    providing a supervised learning algorithm as the machine learning algorithm, wherein the supervised learning algorithm is trained by an ordinary least square method;
    determining a first performable action performable on the wear and tear element by using the determined second condition of the wear and tear element and at least one predefined conditional criterion for the wear and tear element;
    determining a resulting third condition of the wear and tear element by using a conditional change of the wear and tear element, the conditional change being a consequence of the first performable action;
    determining a second performable action performable on the wear and tear element by using the resulting third condition of the wear and tear element and the at least one predefined conditional criterion for the wear and tear element; and
    adjusting a wear prediction model with the machine learning algorithm, and using the wear prediction model to reduce a number of inspections of the wear and tear element;
    wherein at least one action selected from the group consisting of the first performable action and the second performable action is a machining of the wear and tear element.

* * * * *